Figures 4, 5, 6, 7, 8:
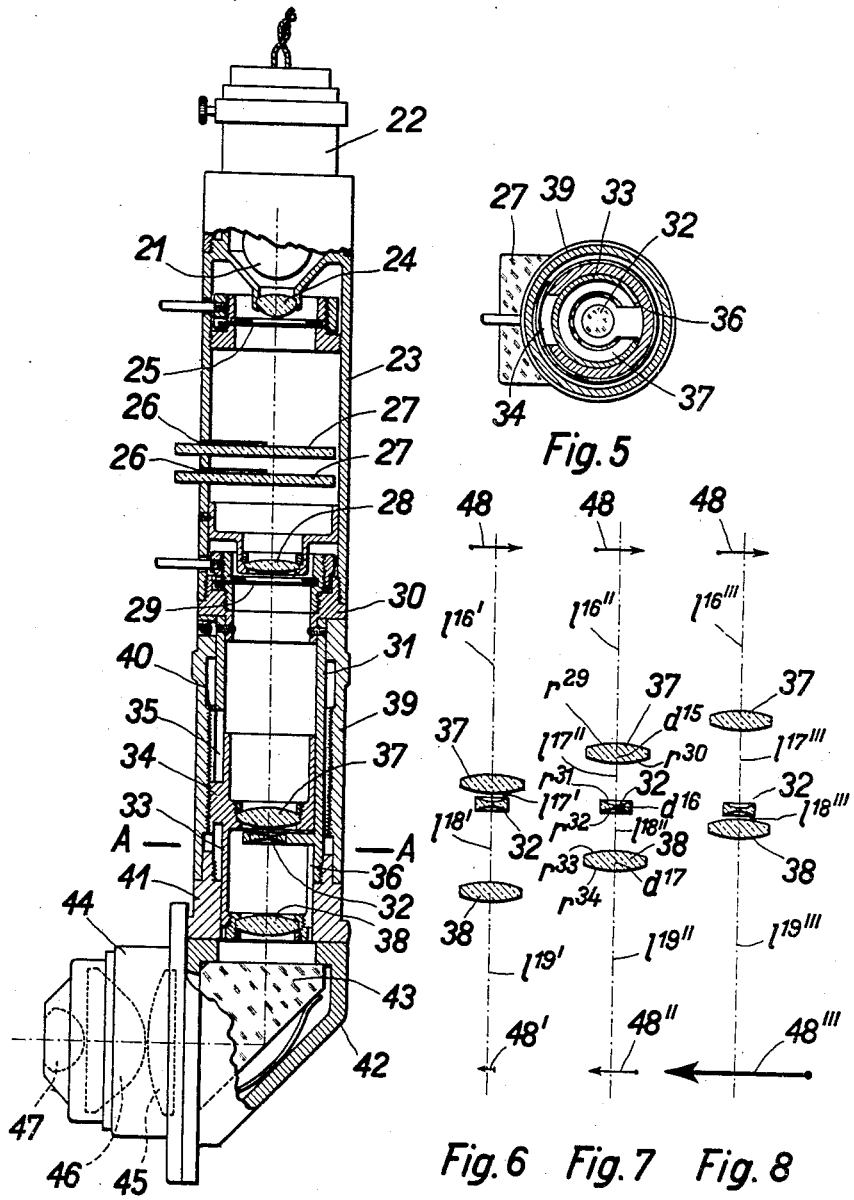

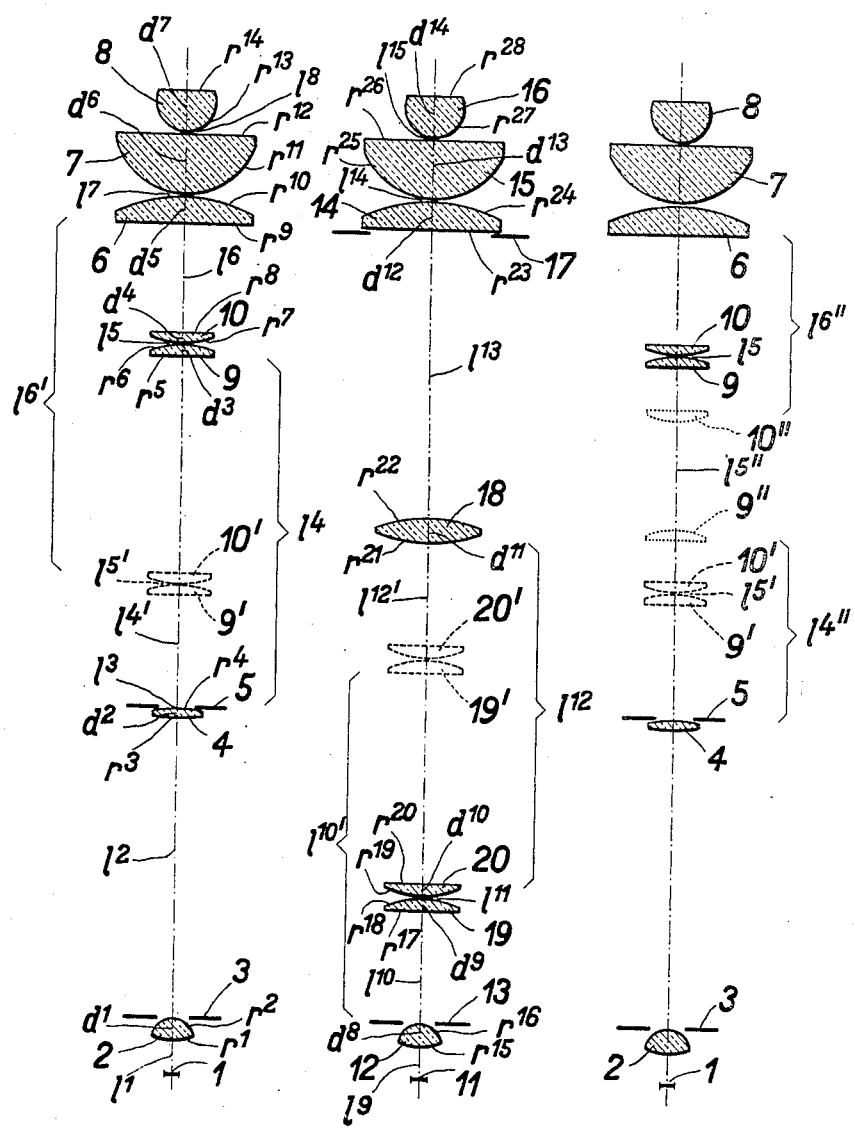

Inventor:
Robert Richter

April 27, 1937. R. RICHTER 2,078,586
DEVICE FOR ILLUMINATING MICROSCOPIC OBJECTS
Filed Dec. 24, 1934 3 Sheets-Sheet 3

Inventor:
Robert Richter

Patented Apr. 27, 1937

2,078,586

UNITED STATES PATENT OFFICE 2,078,586

DEVICE FOR ILLUMINATING MICROSCOPIC OBJECTS

Robert Richter, Jena, Germany, assignor to the firm Carl Zeiss, Jena, Germany

Application December 24, 1934, Serial No. 759,002
In Germany December 23, 1933

3 Claims. (Cl. 88—40)

(Granted under the provisions of sec. 14, act of March 2, 1927; 357 O. G. 5)

Microscopic objects are frequently illuminated by means of an illuminating device containing a source of light, a lamp condenser and a microscope condenser. With a view to obtaining correct images, the aperture of the pencil of illumination rays and the area of the field illuminated by this pencil are to correspond to the aperture of the observation ray pencil, which depends on the used microscope objective, and to the area of the microscopic field of view, respectively. Consequently, to avoid that the observation is restricted to the use of a certain objective, the aperture of the pencil of illumination rays is to be variable. To this effect, the lamp condenser has been supplied with more light than is necessary for the illumination of the microscopic object, and the desired conditions have been obtained by reducing the aperture of the diaphragms disposed in the ray path. In this manner only part of the used apertures and of the areas of the fields of view are available and further variations can be obtained only by changing one of the condensers or by displacing members of the lamp condenser relatively to each other. It follows that using illumination devices of this kind is not very convenient in that light is wasted and in that comparatively troublesome manipulations are required for continuously varying the illumination aperture and the illumination field within the entire range concerned.

The invention concerns a device for illuminating microscopic objects which is of the said kind and may be continuously varied within a wider range as regards the illumination aperture and the area of the illumination field, this new device offering the advantage of an economy of light. The device may be used for microscopic examinations of objects with transmitted as well as with incident light. The inventional idea consists in this that a continuously variable optical system is disposed between the two condensers, the variations of this system entailing great variations of the aperture of the pencil of illumination rays and the area of the illumination field, the use of diaphragms not being necessary in this case, because the product of the numerical aperture and the diameter of the illumination field is approximately constant. If diaphragms are employed in spite of this fact, these diaphragms are for fine adjustment only, that is to say for exact adaptation of the diameter of the illumination field to that of the object field imaged by the microscope objective, and for exact adaptation of the numerical aperture of the pencil of illumination rays to that of the microscope objective.

According to the invention, this improvement can be obtained by providing the illumination device with an additional optical system at least one member of which is displaceable in the direction of the axis of the pencil of illumination rays and which is so disposed between the lamp condenser and the microscope condenser that, by means of the lamp condenser, the source of light is reversely imaged between the light exit apertures of the lamp condenser and the said additional optical system and that this reverse image of the source of light is reversely imaged by the additional optical system in a variable size. This erect and variable image of the source of light is conveniently provided between the front focal plane of the microscope condenser and the plane of the microscopic object to be illuminated, this plane generally coinciding approximately with the rear focal plane of the microscope condenser. The additional optical system is conveniently a system consisting of two displaceable members which have a constant distance apart and of a stationary member disposed between these two displaceable members. When the two displaceable members of the additional optical system are convergent and when the said stationary member is divergent, the focal lengths may be so chosen that the light source image poduced permanently lies in one and the same plane, irrespective of the relative positions of the members of this optical system, which means that this system is approximately pancratic. As a system of the said kind, whose members may have three different positions relatively to each other, images the source of light in exactly one and the same plane, an additional system consisting of two rigidly interconnected members can image the scurce of light in this plane only at two different positions of its members. The reversing systems of pancratic telescopes, in which, contrary to illumination devices, exact images are desired regardless of what position the reversing system assumes, are therefore made to consist of two members which can be displaced conjointly and are movable relatively to each other, these relative movements being such that the telescopic image is produced in one and the same plane, regardless of the position of the reversing system.

With the usual sources of light, illumination instruments are known to economize light and to produce a uniform illumination of the entire area of the illumination field when the Köhler condition is arrived at, according to which an image of the source of light is to lie in the front focal plane of the microscope condenser and an image of the lamp condenser is to lie in the rear focal plane of the microscope condenser. In the new illumination device, this condition is arrived at when the focal lengths and the distances of the additional optical system are such that the erect image of the light source is approximately in the light entrance aperture of the microscope condenser and that the lamp condenser is imaged by means of the additional optical system and the microscope condenser approximately in the plane of the microscopic object to be illuminated.

Figures 9, 10:
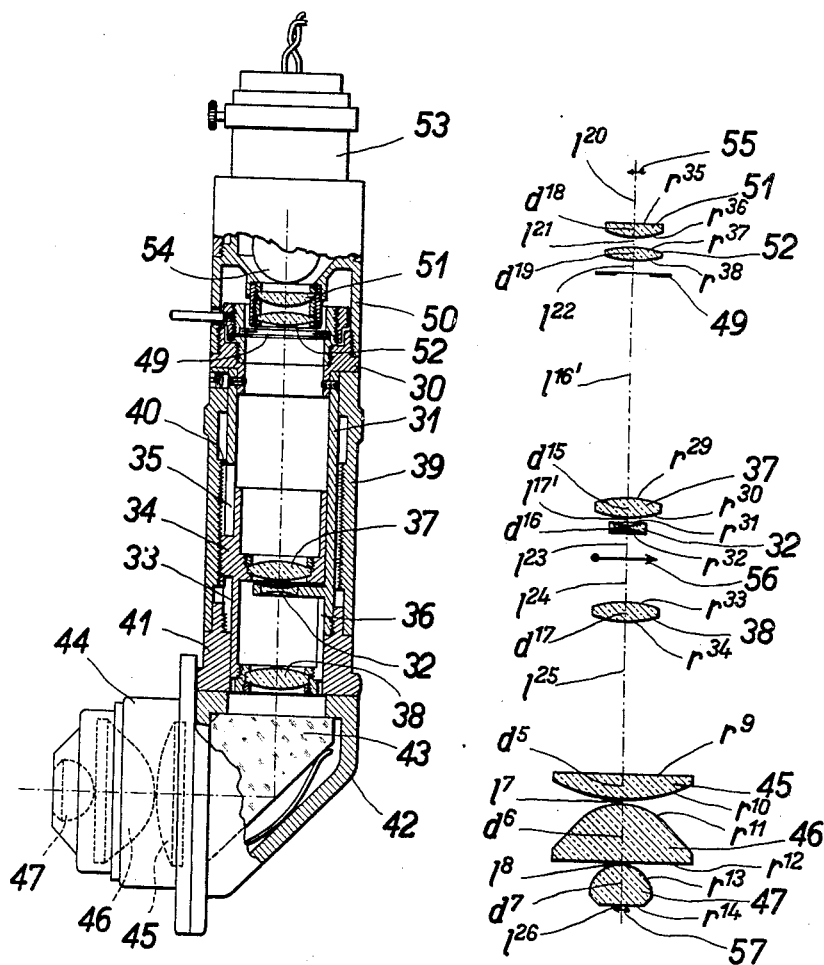

The accompanying drawings illustrate five constructional examples, the first, second, and third of which represent, for purposes of comparison, more or less unsatisfactory solutions of the problem to be solved, and the fourth and fifth of which illustrate the invention. Figures 1 to 3 show the optical parts of the first three examples in schematical sections. Figure 4 represents the fourth constructional example, partly in section. Figure 5 illustrates a section through line A—A in Figure 4. Figures 6 to 8 represent schematically the displaceable optical parts of the fourth constructional example in three different positions. Figure 9 shows the fifth constructional example, partly in section, and Figure 10 represents schematically a section of this example.

The first constructional example (Figure 1) has a source of light 1 and a lamp condenser 2 to which is attached an iris diaphragm 3. At a certain distance from the iris diaphragm 3 are disposed a convergent lens 4 and an iris diaphragm 5. This example has also a microscope condenser consisting of three lenses 6, 7, and 8. Between the diaphragm 5 and the microscope condenser 6, 7, 8 is disposed an additional optical system consisting of two convergent lenses and displaceable in the direction of the axis of the illumination system.

The source of light 1 is reversely imaged in the plane of the iris diaphragm 5 by the lamp condenser 2 and the convergent lens 4. This intermediate image of the source of light and the diaphragm 5 are reversely imaged by the converging lenses 9, 10 approximately in the front focal plane of the microscope condenser 6, 7, 8. Consequently, the image of the source of light 1 is erect. Near the displaceable lens system 9, 10, the convergent lens 4 produces an image of the diaphragm 3, the focal length of the lens 4 being such that the image of the diaphragm 3, which is produced as a real or virtual image behind the displaceable lens system 9, 10, remains unchanged also when the lens system 9, 10 is displaced to the position 9', 10' indicated by dash lines. In that position of the lenses 9, 10 which is represented in the drawings, the intermediate light source image produced on the diaphragm 5, which acts as an aperture diaphragm, is reproduced on the light entrance surface of the lens 6, which coincides approximately with the front focal plane of the microscope condenser, this reproduction being reduced three times. In the position 9', 10', however, the said reproduction of this intermediate image is magnified three times. When this lens 6 has such a diameter that the magnified reproduction of the source of light fills up exactly the light entrance surface of this lens, and when the numerical aperture of the microscope condenser is 1.40, a displacement of the lens system from the position 9, 10 to the position 9', 10' changes the numerical aperture of the illumination system from 0.156 to 1.40. This displacement entails a change according to the ratio of 9:1 of the aperture area of the diaphragm 3 image produced in the object plane by the microscope condenser 6, 7, 8, which acts as a light field diaphragm. The light field which, in the example illustrated by the drawings, has a diameter of 3.21 millimetres when the numerical aperture is 0.156, is accordingly reduced to a diameter of 0.357 millimetres when the numerical aperture is changed to 1.40.

In the second constructional example (Figure 2) a lamp condenser 12 disposed behind a source of light 11 has an iris diaphragm 13. The microscope condenser has three lenses 14, 15, 16. In the front focal plane of this condenser is provided an iris diaphragm 17 which acts as an aperture diaphragm. Between the diaphragms 13 and 17 is a stationary converging lens 18, and between this lens 18 and the diaphragm 13 is disposed a displaceable lens system 19, 20.

The diaphragm 13, which acts as a light field diaphragm, is imaged on the converging lens 18 by the displaceable lens system 19, 20 and in the object plane by the microscope condenser 14, 15, 16. The lamp condenser 12 so projects near the displaceable lens system 19, 20 a reverse intermediate image of the source of light 11 that this reverse image is always imaged in the same plane, also when the lens system 19, 20 is displaced to the position 19', 20' indicated by dash lines. By means of the converging lens 18, there is finally produced in the plane of the aperture diaphragm 17 an erect image of the source of light 11. When the additional lens system 19, 20 is displaced to the position 19', 20', the dimensions of the image of the source of light 11 on the aperture diaphragm 17 and of the image of the illumination field diaphragm 13 in the object plane are changed at the same ratio as those according to the first constructional example. The second constructional example has however one disadvantage as compared to the first constructional example, this disadvantage consisting in this that the aperture area of the aperture diaphragm 17 is to be varied when the displaceable lens system 19, 20 is displaced, provided that it is not desired to have the size of the source of light 11 represent a measure for the aperture of the illumination system. For instance, when the object is to be illuminated by a pencil of illumination rays having an aperture which represents one third of that of the used microscope objective, the aperture diaphragm 5 according to the first constructional example is closed so much that the diameter of its aperture area represents only one third of the greatest diameter of the aperture area. The diaphragm 5 is left in this condition also when the microscope objective is exchanged for another, contrary whereto the aperture diaphragm 17 of the second constructional example is to be given another adjustment when the objectives are changed. In the two described examples, the distance apart of the lenses 9, 10 and 19, 20, respectively, of the displaceable lens system is constant. The said two examples have the disadvantage that the sources of light 1 and 11 and the light field diaphragms 3 and 13 are sharply imaged on the lenses 6 and 14 and in the object plane, respectively, only when the lenses 9, 10 and 19, 20 assume the positions represented in the drawings. When the lenses 9, 10 and 19, 20 assume positions which lie between these extreme positions, the image planes are displaced more or less. Although this displacement in the illumination system may be said to be admissible to a certain extent for the purposes in question, there would be a reduction of that aperture range of the illumination system in which this system could be used to advantage. The undesired displacement of the image planes may be overcome in a simple manner by making the additional optical system, which has at least one displaceable member, consist of two partial systems whose distance apart may be changed. An illumination system of this kind is represented by the third constructional example.

The third constructional example (Figure 3) corresponds to the first example, identical members having identical numerals of reference. In the third example, however, the distance apart of the two lenses 9 and 10 of the additional displaceable optical system is variable. The lenses 9 and 10 can be so displaced to the dash-line positions 9', 10' that the images of the source of light 1 and the iris diaphragm 3 are in all intermediate positions, for instance in the intermediate position 9", 10", approximately in that plane in which they lie when the lenses 9, 10 assume their extreme positions. As is well known, imaging in this manner can be effected when the two displaceable members are controlled for instance by curved guides and a common driving member or by means of other devices which are known with respect to pancratic telescopes.

In the fourth constructional example (Figures 4 to 8), the mount 22 of a glow lamp 21 representing the source of light is disposed in a tubular housing 23. Immediately behind the glow lamp 21 is mounted a convergent lens 24, which represents a lamp condenser, and an iris diaphragm 25. In the housing 23 are provided two slits 26 for colour filters 27 and the like and a convergent lens 28 behind which is disposed an iris diaphragm 29. By means of a ring 30, there is attached to the housing 23 a tubular elongation 31 containing a divergent lens 32 and representing a guide for a sleeve 33 which is displaceable in axial direction and has a threaded part 34 extending through a longitudinal slit 35 in the tubular elongation 31. The sleeve 33 has a longitudinal slit 36, through which extends the mount of the lens 32, and two identical convergent lenses 37 and 38 which are disposed at the two sides of the lens 32, respectively. On the tubular elongation 31 is rotatably disposed a sleeve 39 having an interior thread 40 in mesh with the threaded part 34. A ring 41 connects the tubular elongation 31 to a prism housing 42. In this prism housing 42 is disposed a reflecting prism 43, which deviates the ray path at right angles, and a microscope condenser 44 containing three convergent members 45, 46 and 47.

Apart from the bending of the illumination ray path effected by the prism 43, the fourth constructional example corresponds to the schematically represented first constructional example as regards focal length and distances of the optical members, the exception being the additional optical system which, in the case of the fourth example, is a pancratic system consisting of the three lenses 37, 32, and 38. The effect of this system is represented schematically by Figures 6 to 8. As in the first example, the iris diaphragm 25, which is near the source of light, represents a light field diaphragm, and the other iris diaphragm 29 represents the aperture diaphragm of the illumination system. In the last-mentioned three illustrations, the intermediate image of the incandescent filament of the lamp 21, which is imaged reversely in the plane of the aperture diaphragm 29 by the lenses 24 and 28, is indicated by an arrow 48. In those relative positions of the lenses 37, 32, and 38 which are indicated in Figure 6, the system produces an erect image 48' of the source of light, the size of this image being one third of that of the intermediate image 48. In the other position of the pancratic system (Figure 7), there appears an erect image 48" of the incandescent filament, this image being of the same size as the intermediate image, and in the position represented by Figure 8 there arises an erect image 48''' of three times the size of the intermediate image 48.

When in use, the instrument and the microscope condenser 44 are attached in the known manner to the condenser holder of the microscope. The glow lamp 21 is connected to a suitable circuit. The two convergent lenses 37 and 38 in the sleeve 33 are given the position represented in Figure 8, which is effected by rotating the sleeve 39, and the aperture diaphragm 29 is closed so far that the light source image 48''' produced by the additional system 37, 32, 38 fills up exactly the free aperture of the first lens 45 of the microscope condenser 44. When the instrument is used, the aperture area of the aperture diaphragm 29 thus adjusted remains unchanged. The aperture of the illumination system is changed by rotating the sleeve 39 and, consequently, by displacing the sleeve 33 containing the lenses 37 and 38. The plane in which the images 48', 48" and 48''' and the light source images corresponding to the other positions of the system 37, 32, 38 are produced remains unchanged. According to requirements, colour filters, focusing screens, grey filters or the like may be inserted into the slits 26.

In the fifth constructional example (Figures 9 and 10) use is made of part of the fourth constructional example, identical parts having identical numerals of reference. Contrary to the first four examples, the Köhler condition is not arrived at in the fifth example. This fifth example is however very convenient on account of its especially short length, which makes it extremely handy. The ring 30 contains an iris diaphragm 49 and supports a tubular housing 50 in which is disposed a lamp condenser consisting of two convergent lenses 51 and 52. The one end of the housing 50 is provided with a holder 53 for a frosted glow lamp 54.

When in use, the illumination device is attached to the microscope in the same manner as the one according to the fourth constructional example, and the glow lamp is connected to a circuit. The diaphragm 49 serves also in this case as an aperture diaphragm for the illumination system. If the glow lamp 54 were provided with a transparent instead of a translucent bulb, the lenses 51, 52 of the lamp condenser would image the incandenscent filament 55 (Figure 10) of the lamp 54 reversely within the pancratic reversing system represented by the lenses 37, 32 and 38. This image 56 of the light source represents also in this case the object for the reversing system and the microscope condenser 45, 46, 47, as a consequence of which there arises in the object plane of the microscope an erect image 57 of the light source. The diaphragm 49 is imaged by the reversing system 37, 32, 38 on that surface of the lens 45 of the microscope condenser which faces this system. By rotating the sleeve 39, the lenses 37 and 38 are displaced in the axial direction of the pencil of illumination rays relatively to the lens 32, and the size of the image 57 of the light source and that of the image 48' according to the fourth example are altered without these images changing their places. As the glow lamp 54 has a frosted bulb which diffuses the light, the images of the incandescent filament 55 are rather blurred. The diffusion of the light entails that there arises in the object plane a uniformly illuminated circular surface whose size corresponds approximately to that of the image of the incandescent filament and which ensures a correct illumination of the object.

In the following table, $r$ designates the radii of curvature, $d$ the thicknesses of glass, and $l$ the distances of the optical members of the constructional examples described hereinbefore. The said dimensions are expressed in millimeters. The kinds of glass are characterized by the refractive indices $n_D$ of the D-line of the solar spectrum.

| | | | |
|---|---|---|---|
| $r^1 = +12.93$ | $r^{36} = -10.520$ | $l^{19'} = 30.176$ | $d^6 = 12.0$ |
| $r^2 = -5.6$ | $r^{37} = +27.605$ | $l^{19''} = 37.072$ | $d^7 = 8.073$ |
| $r^3 = +29.665$ | $r^{38} = -27.605$ | $l^{19'''} = 43.967$ | $d^8 = 3.5$ |
| $r^4 = -29.665$ | $l^1 = 7.594$ | $l^{20} = 12.000$ | $d^9 = 2.5$ |
| $r^5 = \infty$ | $l^2 = 56.497$ | $l^{21} = 1.000$ | $d^{10} = 2.5$ |
| $r^6 = -17.384$ | $l^3 = 0.854$ | $l^{22} = 2.400$ | $d^{11} = 5.5$ |
| $r^7 = +17.384$ | $l^4 = 65.694$ | $l^{23} = 6.095$ | $d^{12} = 5.5$ |
| $r^8 = \infty$ | $l^{4'} = 20.632$ | $l^{24} = 8.829$ | $d^{13} = 12.0$ |
| $r^9 = \infty$ | $l^{4''} = 31.898$ | $l^{25} = 29.114$ | $d^{14} = 8.073$ |
| $r^{10} = -32.22$ | $l^5 = 0.500$ | $l^{26} = 1.250$ | $d^{15} = 4.11$ |
| $r^{11} = +11.7$ | $l^{5'} = 0.500$ | $d^1 = 3.5$ | $d^{16} = 0.93$ |
| $r^{12} = \infty$ | $l^{5''} = 23.030$ | $d^2 = 2.5$ | $d^{17} = 4.11$ |
| $r^{13} = +6.008$ | $l^6 = 19.570$ | $d^3 = 2.5$ | $d^{18} = 3.5$ |
| $r^{14} = \infty$ | $l^{6'} = 64.632$ | $d^4 = 2.5$ | $d^{19} = 2.5$ |
| $r^{15} = +12.93$ | $l^{6''} = 30.836$ | $d^5 = 5.5$ | |
| $r^{16} = -5.6$ | $l^7 = 0.500$ | | |
| $r^{17} = \infty$ | $l^8 = 0.000$ | | |
| $r^{18} = -17.384$ | $l^9 = 7.684$ | | |
| $r^{19} = +17.384$ | $l^{10} = 19.888$ | | |
| $r^{20} = \infty$ | $l^{10'} = 65.010$ | | |
| $r^{21} = +28.25$ | $l^{11} = 0.500$ | | |
| $r^{22} = -28.25$ | $l^{12} = 63.879$ | | |
| $r^{23} = \infty$ | $l^{12'} = 18.759$ | | |
| $r^{24} = -32.22$ | $l^{13} = 53.450$ | | |
| $r^{25} = +11.7$ | $l^{14} = 0.500$ | | |
| $r^{26} = \infty$ | $l^{15} = 0.000$ | | |
| $r^{27} = +6.008$ | $l^{16'} = 43.967$ | | |
| $r^{28} = \infty$ | $l^{16''} = 37.072$ | | |
| $r^{29} = +18.415$ | $l^{16'''} = 30.176$ | | |
| $r^{30} = -18.415$ | $l^{17'} = 1.098$ | | |
| $r^{31} = -9.512$ | $l^{17''} = 8.011$ | | |
| $r^{32} = +9.512$ | $l^{17'''} = 14.924$ | | |
| $r^{33} = +18.415$ | $l^{18'} = 14.924$ | | |
| $r^{34} = -18.415$ | $l^{18''} = 8.011$ | | |
| $r^{35} = \infty$ | $l^{18'''} = 1.098$ | | |

Lenses 2, 4, 6, 7, 8, 9, 10, 12, 14, 15, 16, 19, 20, 24, 28, 45, 46, 47, 51, 52_____ $n_D = 1.51633$
Lens 32_____ $n_D = 1.62004$
Lenses 37, 38_____ $n_D = 1.63958$

I claim:

1. A device for illuminating microscopic objects, comprising a housing, a source of light, a lamp condenser, an additional optical system, the said source of light and the said optical parts of the device being disposed in the said housing, a microscope condenser, this microscope condenser being connected to the housing, the said additional optical system consisting of three lenticular members, the one of these members being rigidly mounted in the said housing and the two other of these members being rigidly interconnected and displaceably mounted in the housing, the first said member lying between the said two other members, and means for displacing the displaceable part of the said additional optical system in the said housing in the direction of the axis of the pencil of illumination rays, the said additional optical system being so disposed between the said lamp condenser and the said microscope condenser that the said source of light is reversely imaged by means of the lamp condenser between this lamp condenser and the additional system, and that this reverse image of the source of light is reversely imaged by means of the additional optical system in a variable size.

2. In a device according to claim 1, the said additional optical system consisting of a stationary divergent and two convergent members, the said convergent members being identical.

3. In a device according to claim 1, the said source of light being a glow lamp having a bulb diffusing the light.

ROBERT RICHTER.